US012066899B2

(12) United States Patent
Fitzsimons

(10) Patent No.: US 12,066,899 B2
(45) Date of Patent: Aug. 20, 2024

(54) DATA OBJECT BACKUP VIA OBJECT METADATA

(71) Applicant: Breakthrough Applications LLC, Lewes, DE (US)

(72) Inventor: Tyler Fitzsimons, Sweet Home, OR (US)

(73) Assignee: BREAKTHROUGH APPLICATIONS LLC, Lewes, DE (US)

(*) Notice: Subject to any disclaimer, the term of this patent is extended or adjusted under 35 U.S.C. 154(b) by 0 days.

(21) Appl. No.: 17/336,140

(22) Filed: Jun. 1, 2021

(65) Prior Publication Data

US 2021/0374011 A1  Dec. 2, 2021

Related U.S. Application Data

(60) Provisional application No. 63/032,946, filed on Jun. 1, 2020.

(51) Int. Cl.
*G06F 16/00* (2019.01)
*G06F 11/14* (2006.01)

(52) U.S. Cl.
CPC ...... *G06F 11/1458* (2013.01); *G06F 2201/84* (2013.01)

(58) Field of Classification Search
CPC .......................... G06F 11/1458; G06F 2201/84
USPC ...................................................... 707/654
See application file for complete search history.

(56) References Cited

U.S. PATENT DOCUMENTS

| 2,074,043 | A | * | 3/1937 | Blau | G01V 1/181 |
| | | | | | 310/15 |
| 7,415,585 | B1 | * | 8/2008 | Rossi | G06F 11/1458 |
| | | | | | 711/161 |
| 7,529,782 | B2 | * | 5/2009 | Prahlad | G06F 16/128 |
| 7,552,358 | B1 | * | 6/2009 | Asgar-Deen | G06F 11/1435 |
| | | | | | 714/15 |
| 7,941,619 | B1 | * | 5/2011 | Rossi | G06F 11/1458 |
| | | | | | 707/625 |
| 8,200,638 | B1 | * | 6/2012 | Zheng | G06F 11/1469 |
| | | | | | 707/681 |
| 9,547,560 | B1 | * | 1/2017 | Lee | G06F 11/14 |
| 2009/0083336 | A1 | * | 3/2009 | Srinivasan | G06F 11/1448 |
| 2012/0131321 | A1 | * | 5/2012 | Jitkoff | G06F 9/451 |
| | | | | | 713/2 |
| 2014/0282465 | A1 | * | 9/2014 | Matenaar | G06F 9/44536 |
| | | | | | 717/168 |

(Continued)

FOREIGN PATENT DOCUMENTS

CN 109032837 A * 12/2018 ........ G06F 11/1451

*Primary Examiner* — Monica M Pyo
(74) *Attorney, Agent, or Firm* — Alleman Hall & Tuttle LLP

(57) ABSTRACT

Examples are disclosed that relate to backing up data objects. One example provides, at a computing device, a method, comprising detecting one or more conditions triggering backup of a data object, and in response to detecting the one or more conditions, accessing the data object to retrieve, from metadata associated with the data object, instructions for backing up the data object. The method further comprises executing one or more backup sequences specified by the instructions in which at least a portion of the data object is backed up to one or more storage devices.

20 Claims, 4 Drawing Sheets

(56) References Cited

U.S. PATENT DOCUMENTS

2015/0324255 A1* 11/2015 Kochunni ........... G06F 11/1464
                                                                              711/162
2019/0340081 A1* 11/2019 Pradhan ................ G06F 9/5011
2019/0340082 A1* 11/2019 Pradhan .................. G06F 16/27
2019/0384679 A1* 12/2019 Parambil ............. G06F 11/1464

* cited by examiner

DATA OBJECT BACKUP VIA OBJECT METADATA

CROSS REFERENCE TO RELATED APPLICATIONS

This application claims priority to U.S. Provisional Patent Application Ser. No. 63/032,946, filed Jun. 1, 2020, and entitled AUTOMATED BACKUP AND VERSIONING, the entirety of which is hereby incorporated herein by reference for all purposes.

BACKGROUND

A variety of mechanisms have been developed for backing up and restoring data on a computing device. Some such mechanisms integrate backup/restore functionality in an operating system, which may be configured to save system-wide snapshots at periodic intervals. Other mechanisms integrate backup/restore functionality in an application that creates application-specific backups.

DETAILED DESCRIPTION

Figure 1:
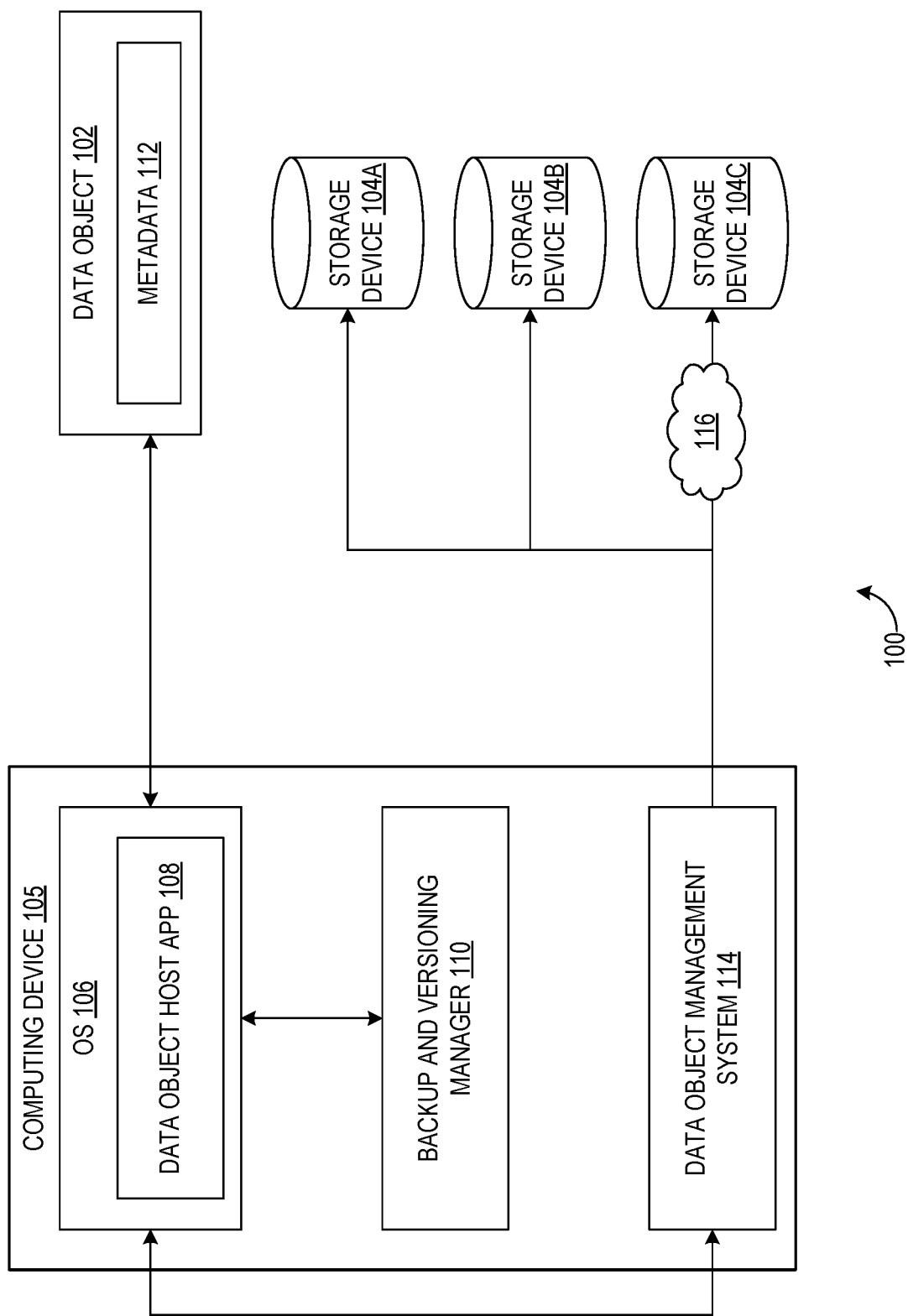
FIG. 1 schematically depicts an example computing system in which a data object is backed up to one or more storage devices.

A variety of mechanisms have been developed for backing up and restoring data on a computing device. Backup mechanisms may be used to restore data that may otherwise be lost or corrupted due to a variety of factors, such as computing device crashes, storage device failure, software defects, or user errors, as examples. Some backup mechanisms integrate backup/restore functionality within an operating system. For example, an operating system may capture (e.g., at regular intervals) snapshots of an entire storage device volume or partition, or a portion of data that has changed relative to a previous snapshot captured at a prior time. Operating system-based backup mechanisms, however, are typically limited to backing up data defined by the operating system, such as specific folders, user contacts, and user favorites. Other backup mechanisms create application-specific backups, such as different versions in time of an application-specific file. Such mechanisms impose additional computational overhead associated with monitoring data for changes, however. Moreover, some application-specific backup mechanisms utilize backup routine information that is stored internally within an application and obscured from end users, thereby limiting the transfer of backup routine information and user control over backup settings. Yet other backup mechanisms abstract the backup process from end users, instead allocating the management of backups to information technology (IT) professionals—e.g., in large-scale computing and enterprise contexts. Such outsourced management may pose significant added cost to an organization and obscure access to backup settings by end users, however. Generally, existing backup mechanisms do not provide end users a sufficient ability to prioritize or select individual data objects for backup, and create undesirable computational overhead in monitoring data for conditions that satisfy backup criteria.

Accordingly, examples are disclosed that relate to backing up data objects according to backup routines specified in metadata associated with the data objects to be backed up. In one example, one or more conditions triggering the backup of a data object are detected. The condition(s) may include the data object being initialized and active. In response to receiving the message, the data object is accessed to retrieve, from metadata associated with the data object, instructions for backing up the data object. The instructions specify one or more backup sequences to be performed, each of which may identify the timing of backups to be performed, the number of backups to be created, location(s) at which backups are to be stored, and/or other aspects of a backup sequence. The one or more backup sequences are then executed as specified by the instructions, in which at least a portion of the data object is backed up to one or more storage devices, which may be local and/or remote to a computing device at which the data object is initially stored.

By encapsulating instructions for the backup of a data object within the metadata of the data object, a highly granular and adaptive backup process may be provided in which any suitable collection of data objects, including individual data objects, can be independently backed up according to backup sequences configured for those data objects. As such, data of any suitable level of granularity may be prioritized for backup, and in a manner defined by user input. The disclosed backup mechanisms may thus afford end users greater control and transparency in executing backups relative to approaches that abstract the backup process from the end user—e.g., by automating backup functionality in an operating system or application-specific backup system, or outsourcing backup management away from end users. The encapsulation of backup instructions within data object metadata may further confer portability to data objects while retaining their associated backup routines, as data objects may be transmitted to different locations with their backup instructions by way of their inclusion in data object metadata. The disclosed approaches may provide these and other potential advantages while minimizing computational overhead associated with monitoring data for conditions that trigger backups.

FIG. 1 schematically depicts an example computing system 100 in which a data object 102 is backed up to one or more storage devices 104. System 100 includes various components that may be implemented on a computing device 105. Detail regarding example computing devices that may implement aspects of system 100 is described below with reference to FIG. 4. Among the various components in system 100 is an operating system 106 configured to execute applications including a data object host application 108. Host, application 108 may be used to create, read, and/or modify data object 102, which may assume any suitable form. As examples, data object 102 may include one or more of a document (e.g., word processor document), spreadsheet, file, image, video, audio, code/instructions/other executable(s), unstructured data, structured data, and semi-structured data. As used herein, a "data object" may refer to a single data object (e.g., file) and/or to multiple data objects (e.g., files).

In the depicted example, host application 108 communicates with OS 106 to activate and initialize data object 102—e.g., into memory of computing device 105. The activation and initialization of data object 102 may occur in response to the data object, being opened, or in response to any other suitable trigger. The activation and initialization of data object 102 triggers the output of a message to a backup and versioning manager 110, where the message indicates that the data object has been activated/initialized. The message may originate from OS 106 and/or host application 108. Upon receiving the message, manager 110 accesses data object 102 to retrieve, from metadata 112 associated with the data object, instructions for backing up the data object. As described below, the instructions specify one or more backup sequences in which at least a portion of data object 102 is backed up to one or more storage devices 104. Access to data object 102 may include reading the data object into memory space allocated to manager 110, for example. It will be understood that, in some examples, data object metadata may not include any backup instructions, in which case no further backup-related actions may be taken regarding the associated data object.

Upon obtaining the backup instructions by accessing metadata 112, manager 110 may determine whether one or more conditions that trigger backup of data object 102 are satisfied. As described below, conditions regarding the timing of backups, locations to be backed up to, and/or the number of backups to be created may be specified in metadata instructions. However, in some examples, metadata instructions may specify that a data object is to be backed up without specifying further conditions. In the depicted example, manager 110 detects that the condition(s) triggering backup of data object 102 are satisfied, and causes the backup of data object 102 by sending a message to OS 106 instructing the backup. In the depicted example, OS 106, upon receiving this message, outputs a message to a data object management system 114 causing the management system to backup data object 102 by creating a snapshot of the data object and storing the snapshot in storage device(s) 104 identified in the instructions. As used herein, "snapshot" refers to a copy of a data object at a point in time (e.g., a copy of the data object as it exists at the point in time at which the snapshot is created). Further, manager 110 and/or management system 114 may be implemented separately from host application 108—e.g., as a standalone application—or at least in part with the host application—e.g., as a plugin, or in another manner that interfaces with the host application.

In the depicted example, data object 102—e.g., the entirety of the data object including metadata 112—is backed up to one or more storage devices 104 identified by the instructions stored in the metadata. Storage devices 104 may assume any suitable form, including but not limited to physical volumes and/or logical volumes (e.g., partitions, virtualized volumes), hard drives, optical drives, and/or tape drives. Further, storage devices 104 may include local storage devices—e.g., storage devices attached to computing device 105 via a local data interface such as a serial AT attachment (SATA) or universal serial bus (USB) interface—and/or remote storage devices—e.g., storage devices attached to the computing device via a network interface. As examples, FIG. 1 depicts two local storage devices 104A and 104B, and a remote storage device 104C communicatively coupled to computing device 105 via a network connection 116. Remote storage device 104C may be provided as part of network-attached storage or a storage area network (SAN), for example. Data object 102 may be copied to remote storage device 104C via internet-based application programming interface (API) calls, as one example. Further, an original instance or copy of data object 102, from which backups of the data object are obtained may be stored at any suitable location, such as one or more of storage devices 104.

The encapsulation of backup instructions within metadata 112 of data object 102 may enable the data object to be transported to other locations (e.g., in the course of making backups of the data object) with its backup instructions intact by way of the instructions accompanying the data object. This may enable subsequent backups of data object 102 through access to metadata 112. As such, data object 102 may be provided in a portable manner, both with respect to its transportability and its ability to be backed up. Moreover, encapsulating backup instructions within metadata 112 may provide greater transparency into the backup routines that control the backup of data object 102, as compared to other backup mechanisms that obscure backup routines and settings from end users. For a general collection of data objects, backup instructions may be provided—through their inclusion in data object metadata—for the data objects at any desired level of granularity, including on a per-data object level. This may enable highly customized and granular backup routines for individual data objects or any suitable collection of data objects. It will be understood that data object metadata, and backup instructions therein, may be encoded in arty suitable manner. As one example, data object metadata may be encoded in a file header of the data object. In other examples where data object 102 is of the JavaScript Object Notation (JSON) format, metadata may be stored in a serialized string format in the object properties comment section.

In some examples, data object metadata may include additional data beyond backup instructions read by manager 110. Such additional data may include but is not limited to information relating to a data object's edit history, timestamps, and statistics such as the time at which a previous backup was created. In a more particular example, additional data may indicate the times at which edits to a data object are made, for each user and for each use session. Such data may be stored as one or more log entries in the data object metadata, for example. In some examples, log entries indicating edits on a per-user and/or per-use-session basis may be accompanied by the provision of an adjustable period of inactivity, which may stop a running timer in the event a data object is left open without changes being made to the data object.

As noted above, one condition triggering the backup of data object 102 may include the data object being active and initialized. This condition may be indicated in the message sent from OS 106 and/or host application 108 to manager 110. Manager 110 may access metadata 112—to determine whether other condition(s) specified in the metadata for triggering backup of data object 102 are satisfied—in response to being notified that the data object is active/initialized, but otherwise may forego such determination until such notification is received. Accordingly, the computational overhead of monitoring for changes to data object 102, when the data object has not been initialized into the workspace of host application 108 or is not active, may be avoided. Generally, messages issued by OS 106 and/or host application 108 and received by manager 110 may indicate the activation and initialization of one or more data objects, along with an identification of those data objects. However, in some examples, a condition stipulating that data object 102 is to be active and/or initialized before undergoing backup may be specified in metadata 112. As such, detecting condition(s) that trigger backup of data object 102 may include detecting condition(s) by accessing metadata 112 and/or receiving messages indicating satisfaction (or lack thereof) of condition(s).

Figure 2:
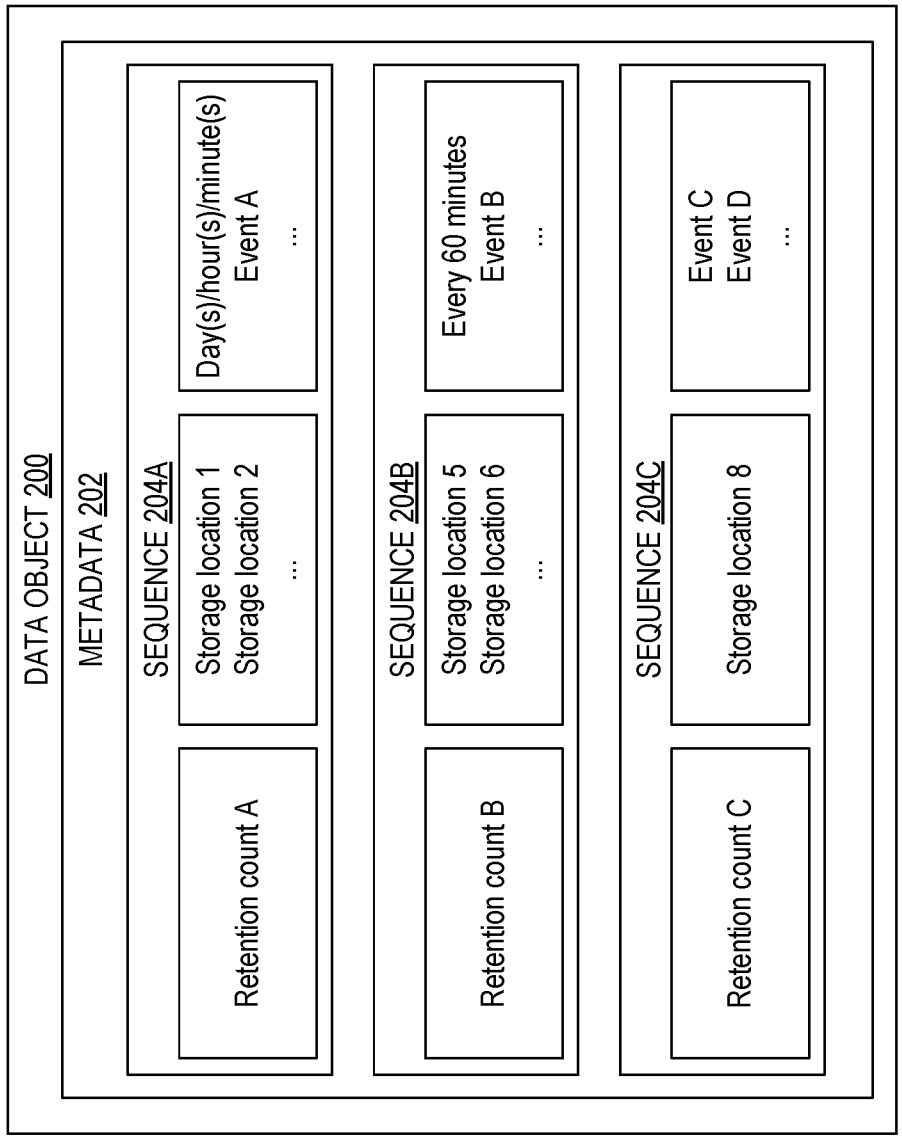
FIG. 2 depicts an example data object that includes metadata encoding backup instructions for backing up the data object.

FIG. 2 depicts an example data object 200 that includes metadata 202 encoding backup instructions that specify multiple backup sequences for the data object. Data object 200 may be data object 102, for example. In the depicted example, metadata 202 specifies a first backup sequence 204A that stipulates a retention count indicating a number of copies of data object 200 to be created, one or more storage locations at which to store copies of the data object, and information regarding the timing at which copies of the data object are to be created. In some examples, the retention count may specify a number of copies of data object 200 to be made—i.e., identical copies of the data object made while the data object is in the same state. Alternatively or additionally, the retention count may specify a number of different versions of data, object 200 to be copied, with each version capturing a different state of the data object. Capturing different versions of data object 200 may enable the provision of a history of the data object for example. As used herein, "copies" and "snapshots" of a data object thus may refer to identical copies of the data object and/or to different versions of the data object.

The storage locations specified in sequences 204 may identify the locations of physical storage devices and/or logical storage locations, for local and/or remote storage devices. Such identification may include specifying an identity of a storage device and/or a network address of a storage device (e.g., for a network-attached remote storage device). In some examples, different storage locations may be specified for different copies of data object 200, whether those copies are of the same or different versions of the data object.

As shown in FIG. 2, information regarding the timing at which copies of data object 200 are to be created may stipulate time(s) at which copies are to be created on any suitable basis, including but not limited to seconds, minutes, hours, days, months, and/or years. With resumed referenced to FIG. 1, manager 110, upon detecting a timing-based condition in sequence 204A, may set a tinier with a duration based on (e.g., equal to) the timing-based condition, and upon expiration of the timer, send a message to OS 106 causing management system 114 to create a snapshot of data object 200 and save the snapshot in storage location/s) identified in the sequence. As one particular example, sequence 204A may stipulate that data object 200 is to be backed up at a periodic interval of every ten minutes to storage device 104C, where the snapshots of the data object include the ten most recent historical versions of the data object. FIG. 2 also illustrates how sequences 204 may specify event-based conditions that prompt backup of data object 200. As one example, an event-based condition may include the closure of data object 200, such that, upon closing the data object, a snapshot of the data object is obtained (depending on other conditions that may be specified for the data object). Through the provision of multiple backup sequences for a common data object as illustrated in FIG. 2, a greater degree of redundancy and control in the backup process of data objects may be enabled.

It will be understood that, in some examples, a backup sequence may be executed even though an interval defined by a timing-based condition has expired. For example, manager 110 may initiate backup of data object 200 upon closing of the data object even though an associated interval has not expired, so as to capture the most up-to-date version of the data object. Further, in some examples, a backup sequence may not be executed even though an interval defined by a timing-based condition has expired. For example, manager 110 may delay backup of data object 200, even though an associated interval has expired, until a minimum interval, starting from the time at which the data object is initialized into memory, is expired. Such delays may occur where intervals defined by timing-based conditions in sequences 204 are relatively short (e.g., less than sixty minutes).

Figure 3:
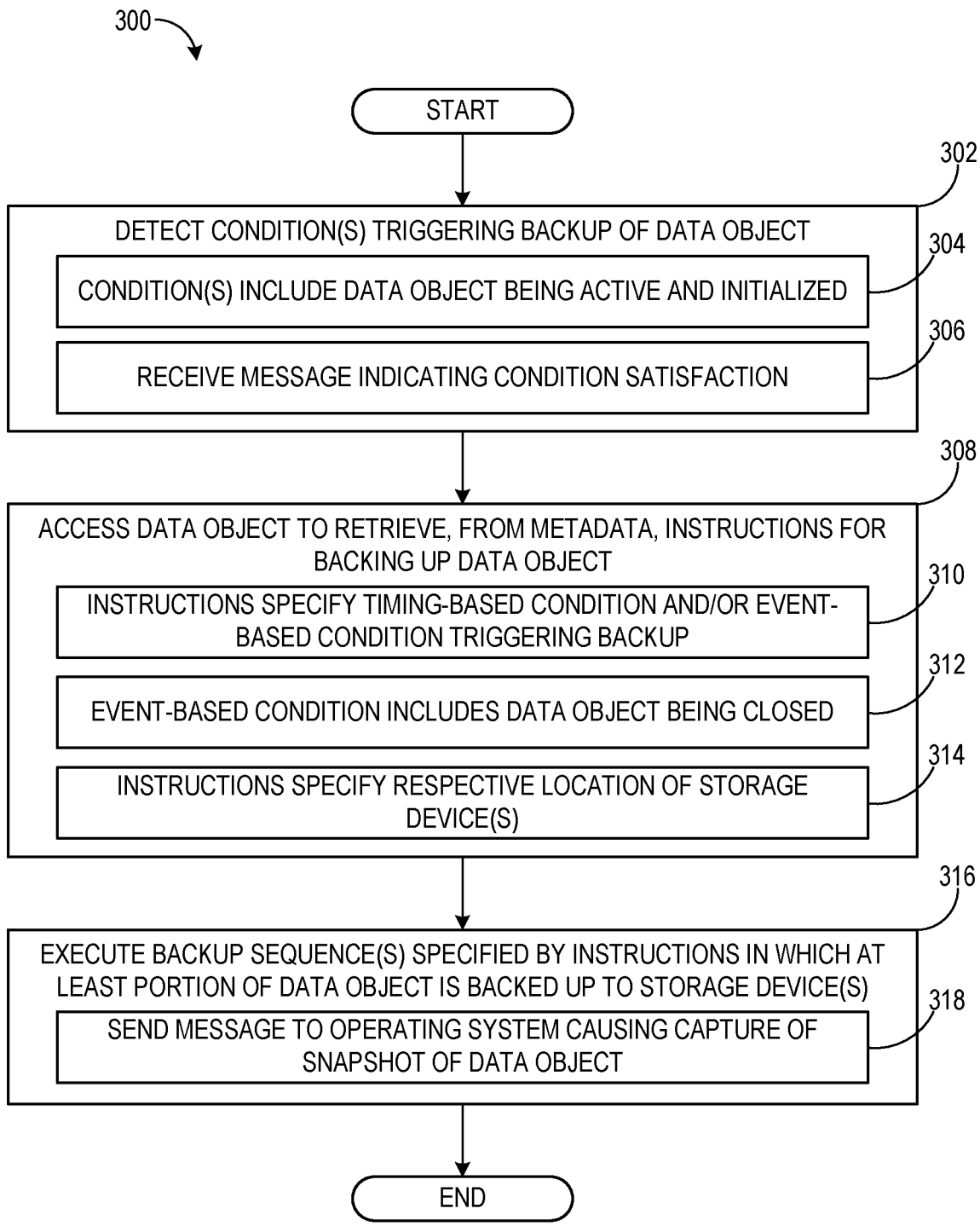
FIG. 3 depicts a flowchart illustrating an example method of backing up at least a portion of a data object.

It will also be under stood that examples are possible in which a user manually initiates the creation of a backup of a data object without defining any timing-based condition and/or event-based condition. Such manual backup creation may be executed through a graphical user interface (GUI), for example. The GUI may be used to define backup sequences, which may be created by manager 110, for example. Further, the GUI may enable users to establish a source data object to be backed up, destination(s) at which to store data object snapshots, intervals and other timing-based conditions, event-based conditions, and retention/version counts. In some examples, the GUI may enable users to create backup sequence templates that may be extended, modified or unmodified, to data objects other than those for which the templates are initially created, FIG. 3 shows a flowchart illustrating an example method 300 of backing up at least a portion of a data object. Method 300 may be implemented by computing device 105 and/or computing system 400 described below with reference to FIG. 4, for example.

At 302, method 300 includes detecting one or more conditions triggering backup of a data object. The condition(s) may include 304 the data object, being active and initialized. In some examples, a host application providing the data object may output a message indicating that the data object is active and initialized. In these and other examples, detecting the condition(s) may include receiving 306 a message indicating satisfaction of such conditions—i.e., that the data object is active and initialized. Alternatively or additionally, an operating system may output a message indicating that the data object is active and initialized.

At 308, method 300 includes, in response to detecting the one or more conditions, accessing the data object to retrieve, from metadata associated with the data object, instructions for backing up the data object. The instructions may specify 310 one or more of a timing-based condition (e.g., one or more periodic intervals at which to create backups) and an-event based condition that trigger backup of at least the portion of the data object. The event-based condition may include 312 the data object being closed. The instructions may specify 314 a respective location of the one or more storage devices.

In some examples, the condition(s) detected at 302 may be referred to as initial conditions, whose satisfaction may trigger access to the metadata associated with the data object. Conversely, the condition(s) specified in the instructions stored by the metadata may be refereed to as backup condition(s), whose satisfaction may trigger the execution of backup sequence(s) in which at least a portion of the data object is backed up.

At 316, method 300 includes executing one or more backup sequences specified by the instructions in which at least a portion of the data object is backed up to one or more storage devices. Executing the backup sequence(s) may include 318 sending a message to an operating system, the message causing a snapshot of the data object to be captured.

The examples described herein may provide a more granular, robust, and user-controllable mechanism for backing up data, through at least in part support for user definition of backup sequences that stipulate conditions triggering data backup, types of backups to be created, and the locations where backups are to be created. User control may also be afforded over the version count of a data object before its oldest versions are overwritten, and the creation of nested backup sequences routines to create multiple intervals. Further, both data itself and its associated backup sequences may be transported among different locations in a portable form that encapsulates the data together with its backup sequences encoded in metadata.

In some embodiments, the methods and processes described herein may be tied to a computing system of one or more computing devices. In particular, such methods and processes may be implemented as a computer-application program or sevice, an application-programming interface (API), a library, and/or other computer-program product.

Figure 4:
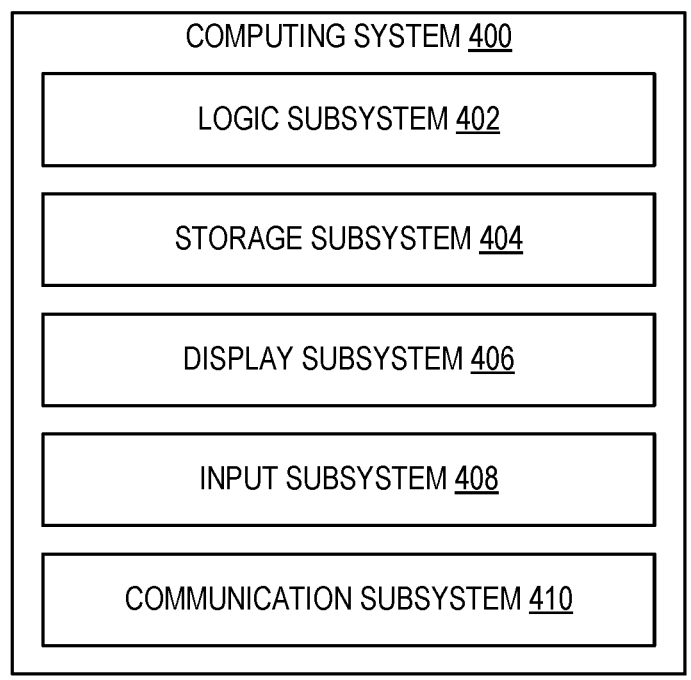
FIG. 4 schematically depicts an example computing system.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic subsystem 402 and a storage subsystem 404. Computing system 400 may optionally include a display subsystem 406, input subsystem 408, communication subsystem 410, and/or other components not shown in FIG. 4.

Logic subsystem 402 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic machines configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 404 includes one or more physical devices configured to hold instructions executable by the logic subsystem to implement the methods and processes described herein. When such methods and processes are implemented, the state of storage subsystem 404 may be transformed—e.g., to hold different data.

Storage subsystem 404 may include removable and/or built-in devices. Storage subsystem 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 404 may include volatile, nonvolatile, dynamic, static, read/write, read-only, random-access, sequential-access, location-addressable, file-addressable, and/or content-addressable devices.

It will be appreciated that storage subsystem 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 402 and storage subsystem 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic subsystem 402 executing instructions held by storage subsystem 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 406 may be used to present a visual representation of data held by storage subsystem 404. This visual representation may take the form of a graphical user interface (GUI). As the herein described methods and processes change the data held by the storage subsystem, and thus transform the state of the storage subsystem, the state of display subsystem 406 may likewise be transformed to visually represent changes in the underlying data. Display subsystem 406 may include one or more display devices utilizing virtually any type of technology. Such display devices may be combined with logic subsystem 402 and/or storage subsystem 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method, comprising:
   detecting one or more conditions triggering backup of a data object;
   in response to detecting the one or more conditions, accessing the data object to retrieve, from metadata encoded within the data object, first instructions for backing up the data object, such that i) a timing at which backups of the data object should be performed, ii) a number of backups of the data object to be created, and iii) a location at which backups of the data object are to be stored, are specified by the first instructions retrieved from the metadata;
   executing one or more backup sequences specified by the first instructions in which at least a portion of the data object is backed up to one or more computer data storage devices;
   detecting one or more second conditions triggering backup of a second data object;
   in response to detecting the one or more second conditions, accessing the data object to retrieve, from metadata encoded within the second data object, second instructions for backing up the second data object, the second instructions for backing up the second data object specifying different backup parameters from the first instructions; and
   executing one or more second backup sequences specified by the second instructions in which at least a portion of the second data object is backed up to the one or more computer data storage devices.

2. The method of claim 1, where the first instructions specify an-event based condition that triggers backup of at least the portion of the data object.

3. The method of claim 2, where the event-based condition includes the data object being closed.

4. The method of claim 1, where the location at which backups of the data object are to be stored includes a respective location of the one or more computer data storage devices.

5. The method of claim 1, where the one or more conditions include the data object being active and initialized.

6. The method of claim 1, where detecting the one or more conditions includes receiving a message indicating satisfaction of the one or more conditions, and where the message is received from one or both of an operating system and a host application of the data object.

7. The method of claim 1, where executing the one or more backup sequences includes sending a message to an operating system executing on the computing device, the message causing a snapshot of the data object to be captured.

8. A computing device, comprising:
   a logic subsystem; and
   a storage subsystem comprising data instructions executable by the logic subsystem to:
      detect one or more conditions triggering backup of a data object;
      in response to detecting the one or more conditions, access the data object to retrieve, from metadata encoded within the data object, first backup instructions for backing up the data object, such that i) a timing at which backups of the data object should be performed, ii) a number of backups of the data object to be created, and iii) a location at which backups of the data object are to be stored, are specified by the first backup instructions retrieved from the metadata;
      execute one or more backup sequences specified by the first backup instructions in which at least a portion of the data object is backed up to one or more computer data storage devices;
      detect one or more second conditions triggering backup of a second data object;
      in response to detecting the one or more second conditions, access the second data object to retrieve, from metadata encoded within the second data object, second backup instructions for backing up the second data object, the second backup instructions specifying different backup parameters from the first backup instructions; and
      execute one or more second backup sequences specified by the second backup instructions in which at least a portion of the second data object is backed up to the one or more computer data storage devices.

9. The computing device of claim 8, where the first backup instructions specify an-event based condition that triggers backup of at least the portion of the data object.

10. The computing device of claim 9, where the event-based condition includes the data object being closed.

11. The computing device of claim 8, where the location at which backups of the data object are to be stored includes a respective location of the one or more computer data storage devices.

12. The computing device of claim 8, where the one or more conditions include the data object being active and initialized.

13. The computing device of claim 8, where the data instructions executable to detect the one or more conditions are further executable to receive a message indicating satisfaction of the one or more conditions, and where the message is received from one or both of an operating system and a host application of the data object.

14. The computing device of claim 8, where the data instructions executable to execute the one or more backup sequences are further executable to send a message to an operating system executing on the computing device, the message causing a snapshot of the data object to be captured.

15. A non-transitory computer-readable storage medium, comprising:
- a data object;
- a second data object;
- metadata encoded within the data object, the metadata comprising first instructions for backing up the data object, the instructions specifying one or more backup sequences in which at least a portion of the data object is backed up to one or more computer data storage devices, such that i) a timing at which backups of the data object should be performed, ii) a number of backups of the data object to be created, and iii) a location at which backups of the data object are to be stored, are specified by the first instructions; and
- second metadata associated with the second data object, the second metadata comprising second instructions for backing up the second data object, the second instructions specifying different backup parameters from the first instructions, the second instructions specifying one or more second backup sequences in which at least a portion of the second data object is backed up to the one or more computer data storage devices.

16. The non-transitory computer-readable storage medium of claim 15, where the first instructions specify an-event based condition that triggers backup of at least the portion of the data object.

17. The non-transitory computer-readable storage medium of claim 16, where the event-based condition includes the data object being closed.

18. The non-transitory computer-readable storage medium of claim 15, where the location at which backups of the data object are to be stored includes a respective location of the one or computer data more storage devices.

19. The non-transitory computer-readable storage medium of claim 15, where the timing at which backups of the data object should be performed is specified by the first instructions, and includes a periodic interval at which to back up at least the portion of the data object.

20. The non-transitory computer-readable storage medium of claim 15, where the first instructions specify a retention count of at least the portion of the data object to be backed up.

* * * * *